C. H. HINDS.
FRICTIONAL ELECTRIC MACHINE.

No. 184,621. Patented Nov. 21, 1876.

Witnesses.
Robt E. Miller
Chas. Stahlers

Inventor.
Charles H. Hinds
by
VanSantvoord & Hauff
his attys

UNITED STATES PATENT OFFICE.

CHARLES H. HINDS, OF NEW YORK, N. Y.

IMPROVEMENT IN FRICTIONAL ELECTRIC MACHINES.

Specification forming part of Letters Patent No. 184,621, dated November 21, 1876; application filed August 26, 1876.

*To all whom it may concern:*

Be it known that I, CHARLES H. HINDS, of the city, county, and State of New York, have invented a new and Improved Electrical Machine, which invention is fully set forth in the following specification, reference being had to the accompanying drawing, in which—

Figure 3:
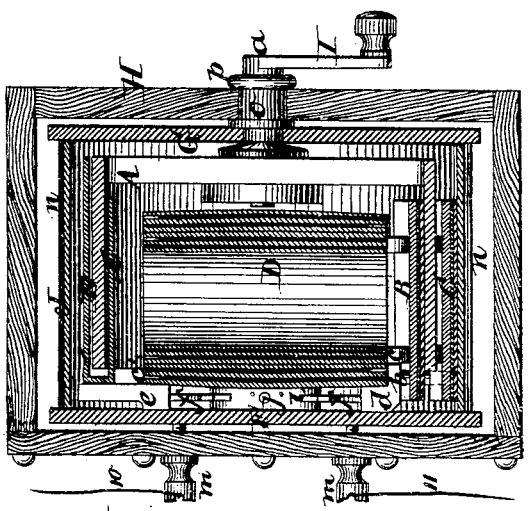
Figure 2:
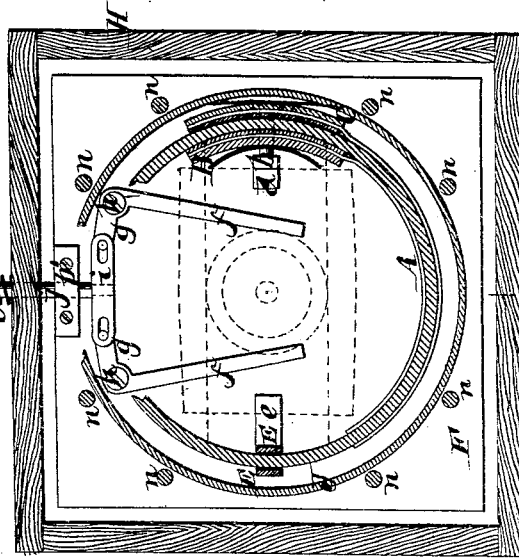
Figure 1:
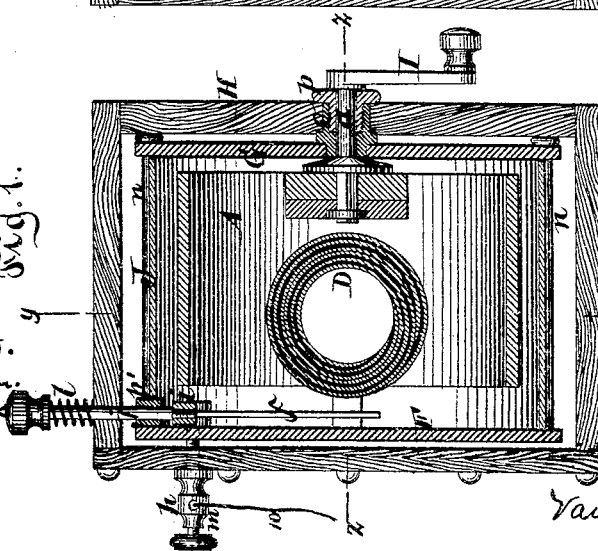

Figure 1 represents a transverse vertical section in the plane $x\ x$, Fig. 2. Fig. 2 is a longitudinal section in the plane $y\ y$, Fig. 1. Fig. 3 is a horizontal section in the plane $z\ z$, Fig. 1.

Similar letters indicate corresponding parts.

This invention consists in the combination, in a frictional electrical machine, of a cylindrical generator open at one end, one or more rubbers acting on the outer surface of said generator, and one or more rubbers which act on its inner surface; also, in a condenser composed of alternate sheets of india-rubber and metal foil, each sheet of india-rubber being made of a vulcanized sheet situated between two unvulcanized sheets, so that when the whole has been rolled up and vulcanized, the leakage of electricity through porous places, which may exist in the sheets which are unvulcanized when first put in, will be prevented; further, in a discharging device composed of two bell-crank levers, a link connecting the short arms thereof, and a spring-button acting on said link; also, in the combination of a cylindrical generator open at one end, and with a tubular condenser situated within the generator, and a discharging device, of a jacket inclosing the generator and the condenser, and of a suitable casing for the protection of the working parts of the machine, said working parts being suspended in the case by means of an insulated plate, to prevent loss of electricity.

In the drawing, the letter A designates the generator of my electrical machine, which is cylindrical in form, and made of hard rubber, glass, or any other material suitable for the purpose. This cylindrical generator has the peculiarity that it is open at one end, so that a rubber can be applied to its inner as well as to its outer surface. The opposite end of said generator is either provided with a head or with a bridge, from which extends a gudgeon, $a$, by means of which the generator is rotated, as will be hereafter more fully explained. B and C are the two rubbers, both of which are supported by one and the same pin, $b$, one inside and the other outside of the generator, each of said rubbers being provided with suitable springs, which serve to hold the same up against the surface of the generator. D is the condenser, which is situated in the inside of the generator, and which is constructed of alternate layers of india-rubber and of metal foil.

The usual practice in the construction of condensers of this class has been to take an unvulcanized sheet of india-rubber, then a leaf of metal foil, then again an unvulcanized sheet of india-rubber, and so on, and after the several sheets had been placed one on the top of the other, the whole was finally vulcanized.

In this process it happens frequently that the interior portions of the india-rubber sheets do not become thoroughly vulcanized, and that porous places remain, whereby a great loss of electricity is produced. This defect I have remedied in my condenser by using compound sheets of india-rubber, each sheet being composed of two unvulcanized sheets, between which is placed a vulcanized sheet, so that when the roll has been formed and vulcanized no leakage of electricity can take place, for, even if porous places should exist in one of the primary india-rubber sheets, it is not likely that such places shall be exactly opposite to porous places in the other primary sheet, and if, by accident, such should be the case, the intermediate vulcanized sheet, which was originally placed between the two (at that time unvulcanized) primary sheets, will prevent leakage of electricity. This principle is applicable to condensers made flat or cylindrical, or in any desired form or shape.

The leaves of metal foil are cut narrower and shorter than the india-rubber sheets, and they are provided with extensions $c\ c'$, which, when the condenser is formed, extend clear to its ends. The projections $c$, on one end of the condenser, are in metallic contact with the pin $b$ that supports the two rubbers B C, and on the opposite end of the generator are situated the conductors E, one of which is situated inside and the other outside of said generator, and which rise from a metal bar, $e$, that extends under or behind the generator. The pin $b$ is secured to an L-shaped piece, $d$, of metal, one arm of which extends under or behind the condenser, so that its end faces the end of the metal bar $e$, which supports the conductors. Between the ends of bar $e$ and piece $d$ are situated the long arms $f$ of bell-crank levers $f g$, which swing on pivots $h$, and the short arms $g$ of which are connected by a link, $i$, from which extends a rod, $j$, carrying a button or finger-piece, $k$, which is exposed to the action of a spring, $l$, having a tendency to throw the ends of a long arm, $f$, back out of contact with the bar $e$ and piece $d$. By depressing the button $k$, the arms $f$ are brought in contact with the bar $e$ and piece $d$, and the condenser is discharged. On the pivots $h$ are secured screw-studs $m$, from which extend wires 10 and 11 to the place where the electric spark is to take effect. The bar $e$ and L-shaped piece $d$, which support the condenser, are secured to a plate, F, of hard rubber, in which are secured a series of traverses, $n$, which serve to connect the plate F with a similar plate, G, and in the center of the last-named plate is secured a tubular nipple, $o$, with an internal screw-thread to receive a thumb-screw, $p$, which serves to secure the plate G, together with the entire apparatus, to one end of a case, H, of wood, or any other suitable material. The nipple $o$ and the thumb-screw $p$ are bored out to form the bearing for the gudgeon $a$ of the generator, and to the outer end of this gudgeon is secured a winch, I, which serves to impart to the generator the requisite revolving motion. The rod $j$, which supports the button $k$, extends out through a hole in top of the case H, being guided in a block, $p'$, of hard rubber, which is firmly secured to the plate F. The generator and condenser are surrounded by a jacket, J, of hard rubber, or other insulating material, to confine the electricity and to prevent it from escaping.

By these means a simple, cheap, compact, and effective electrical machine is obtained, which can be used for lighting gas by electricity, and for all other purposes for which electrical machines are applicable.

What I claim as new, and desire to secure by Letters Patent is—

1. The combination, in a frictional electrical machine, of a cylindrical generator open at one end, one or more rubbers acting on the exterior surface of said generator, and one or more rubbers acting on its interior surface, substantially as shown and described.

2. In a condenser for electricity, composed of alternate layers of india-rubber and metal foil, the combination, with the metallic layers, of compound sheets of rubber, each sheet being made of a vulcanized sheet situated between two unvulcanized sheets, the whole being constructed substantially as set forth.

3. A discharging device for a frictional electrical machine composed of two bell-crank levers, a link connecting the short arms thereof, and a spring-button acting on said link, substantially as shown and described.

4. The combination of a cylindrical generator open at one end, with a tubular condenser placed inside of said generator, substantially as set forth.

5. The combination, with a cylindrical generator open at one end, a tubular condenser situated within the generator, and a discharging device, of a jacket inclosing the generator and the condenser, and of a suitable casing for the protection of the working machine, said working parts being suspended in the case by means of insulated plates, substantially as and for the purpose described.

CHAS. H. HINDS. [L. S.]

Witnesses:
W. HAUFF,
E. F. KASTENHUBER.